United States Patent [19]

Hansen et al.

[11] 3,915,726

[45] Oct. 28, 1975

[54] PRODUCTION OF VOID CONTAINING POLYMER FILMS USING AN EMULSIFIED, HIGH BOILING NON-SOLVENT

[75] Inventors: Charles M. Hansen, Glenshaw; Marco Wismer, Gibsonia, both of Pa.

[73] Assignee: PPG Industries, Inc., Pittsburgh, Pa.

[22] Filed: Nov. 14, 1973

[21] Appl. No.: 415,920

[52] U.S. Cl. ............... 106/122; 106/170; 106/171; 260/2.5 R; 260/2.5 B; 260/2.5 M; 260/32.4; 260/33.6 R; 260/33.6 UA; 117/161 C; 117/161 R
[51] Int. Cl.² ............... C08H 9/28; C08H 9/00
[58] Field of Search ......... 100/122; 260/2.5 B, 32.4, 260/33.2 R, 33.6 R, 33.6 UA, 2.5 M; 117/36.7, 161 C, 161 R; 252/316; 106/170, 171, 122

[56] References Cited
UNITED STATES PATENTS

| | | | |
|---|---|---|---|
| 2,678,278 | 5/1954 | Schmutzier | 106/22 |
| 3,020,172 | 2/1962 | Mohnhaupt | 117/36.7 |
| 3,031,328 | 4/1962 | Larsen | 117/36.7 |
| 3,585,149 | 6/1971 | Vassiliades | 117/100 X |
| 3,657,144 | 4/1972 | Yoshida | 117/100 B |
| 3,661,807 | 5/1972 | Seiner | 260/2.5 M |
| 3,681,269 | 8/1972 | Heitz | 260/2.5 B |
| 3,784,391 | 6/1974 | Kruse | 106/170 |
| 3,819,542 | 6/1974 | Krieder | 260/2.5 M |

OTHER PUBLICATIONS
Chem. Dictionary, 1961, 6th Edition, pp. 566, 728.

*Primary Examiner*—Theodore Morris
*Attorney, Agent, or Firm*—Frank J. Troy

[57] ABSTRACT

Highly opaque films which are opaque without the use of opacifying pigments are formed by applying to a substrate a coating composition of an oil-in-oil type comprising:

A. a continuous phase comprising a film forming gelable polymer dissolved in an organic solvent, and B. a dispersed phase comprising minute droplets of an emulsified high-boiling organic non-solvent;

upon evaporation of the organic polymer solvent, the film-forming polymer gels entrapping therein the high-boiling organic non-solvent and upon further evaporation the non-solvent is removed, leaving behind small voids in its place. These voids cause the film to be opaque.

15 Claims, No Drawings

PRODUCTION OF VOID CONTAINING POLYMER FILMS USING AN EMULSIFIED, HIGH BOILING NON-SOLVENT

BACKGROUND OF THE INVENTION

1. Field of the Invention

This invention relates to films which are opaque and microporous but which need not contain pigments conventionally used in the preparation of opaque films. More particularly, this invention relates to a method of making such films from a coating composition of an oil-in-oil type, and to the compositions employed in the method.

2. Description of the Prior Art

Various techniques for rendering polymeric films opaque have been developed in the past. Each of these techniques seek to optimize optical opacity in its own way. For example, opaque films are most conventionally prepared by adding a pigment which acts as an opacifying agent to a solution of film-forming material which would otherwise be colorless or transparent when cast in a film. As will be more fully explained hereinafter, the amount and size of the pigment particles generally are felt to be the criteria for optimum opacity.

Optical opacity, for example, the hiding power of a paint film, is achieved either by absorption of the incident light or by scattering of the incident light, or a combination of these two. Thus, black is opaque because it absorbs the light incident on it and white is opaque because it back scatters the incident light. Light is either absorbed or scattered before it can reach the substrate. The ideal white pigment then is one which has zero absorption and maximum scattering.

Absorption depends primarily on the electronic structure of the molecule, as well as on the pigment particle sizes relative to the wave length of light. Scattering depends on the relative refractive indices of pigment and vehicle as well as on the particle size of the pigment relative to the wave length of incident light.

One simple description of the relation of the scattering and absorption to the resulting reflectance is that of Kubelka and Munk. At complete hiding, the following equation applies:

$$\frac{(1-Roo)^2}{2\,Roo} = \frac{K}{S} \qquad \text{(Equation 1)}$$

wherein $Roo$ is reflectance of a film so thick that a further increase in thickness does not change the reflectance, $K$ is the absorption coefficient and $S$ is the Kubelka-Munk scattering coefficient. No account is taken of the surface reflectances, and the equation applies only to internal reflectance.

The fractions contributed by more than one pigment in a system are additives as shown by the following equation:

$$\frac{(1-R)^2}{2R} = \frac{C_1 K_1 + C_2 K_2 + C_3 K_3}{C_1 S_1 + C_2 S_2 + C_3 S_3} \qquad \text{(Equation 2)}$$

wherein $C_1$, $C_2$ and $C_3$ refer to the concentrations of pigments, 1, 2, 3, etc.

When hiding is incomplete, the following equation applies:

$$R = \frac{1 - Rg(a - b\,ctgh\,bSX)}{(a - Rg + b\,ctgh\,bSX)} \qquad \text{(Equation 3)}$$

where $R$ is the resulting internal reflectance, $Rg$ is the reflectance of the substrate, $a$ is equal to $(S+K)/S, b = (a^2 - 1)^{1/2}$
$S$ is the scattering coefficient, $X$ is the thickness of the film in mils, and ctgh refers to hyperbolic contangent.

The Kubelka-Munk scattering coefficient may be completed from the following equation:

$$SX = \frac{1}{b}\,Ar\,ctgh\,\frac{1 - aRo}{bRo} \qquad \text{(Equation 4)}$$

where $Ar\,ctgh$ refers to the inverse hyperbolic cotangent, $Ro$ is the reflectance over a black substrate, of 0 percent reflectance, $a$ may be found from the relation, $$a = \frac{1}{2}\left[R + \frac{Ro - R + Rg}{RoRg}\right]$$

and $b$ is determined as above. In this equation, $R$ equals reflectance over a white substrate and $Rg$ is reflectance of the substrate which is coated; or $a$ may be found from the following equation:

$$a = \frac{1}{2}\left[\frac{1}{Roo} + Roo\right]$$

$K$ may be found from the equation $K = S(a-1)$.

The Kubelka-Munk analysis is discussed in further detail by D. B. Judd in "Color in Business, Science and Industry," John Wiley and Sons, New York (1952), pp. 314–338; and by D. B. Judd and G. Wyszecki in "Color in Business, Science and Industry," 2nd. Edition, John Wiley and Sons, New York (1963), pp. 387–413, the disclosures of which are incorporated herein by reference.

Various processes have been described in the art for preparing opaque films which rely for opacity upon the presence of large number of voids in the film. Such films may be prepared by depositing a film from an emulsion, i.e., either an oil-in-water or a water-in-oil emulsion. When a water-in-oil emulsion is used, i.e, one in which minute droplets of water are dispersed in a continuous phase of a film-forming material, the emulsion is deposited as a coating and the organic solvent which comprises the continuous phase of the emulsion is evaporated therefrom. This causes gelation of the film-forming material and entrapment of the dispersed water droplets. The water is then evaporated leaving microscopic voids throughout the film structure.

When an oil-in-water emulsion is used, the mechanism for forming the film is similar to that described above. A film-forming material is dissolved in water. Thereafter, an organic liquid which is a non-solvent for the film former and which is not miscible with water is emulsified in the aqueous phase. The emulsion is cast as a film and the water is evaporated causing the film-forming material to gel and entrap minute droplets of the organic liquid. This liquid is then evaporated to cause minute voids in the film structure.

Another technique for obtaining porous, opaque, non-pigmented films is by preparing an aqueous dispersion of a film-forming polymer containing a water-soluble organic solvent in an amount which is insufficient to dissolve the polymer. This aqueous dispersion is then cast as a film and water is evaporated, causing entrapment of minute droplets of the organic solvent in the polymer. The film is then washed to dissolve the entrapped minute droplets of solvent and the film is dried.

However, water-in-oil and oil-in-water emulsions of the prior art possessed several serious disadvantages which severely limited their potential uses. For example, in the case of oil-in-water emulsions, the continuous phase comprised a film-forming polymer dissolved in water with the dispersed phase comprising droplets of the oil. In this type emulsion, it was necessary that the film-forming polymer be water-soluble. Thus, the number of film-forming polymers which can be employed was severely limited. Moreover, where the corrosion resistance of the substrate to be coated by the emulsion is important, these water-containing prior art emulsions were not favored.

The emulsions of the present invention do not possess these disadvantages. Thus, the emulsions of the present invention have a continuous phase comprising a film-forming gelable polymer dissolved in an organic solvent. This permits the use of a wide variety of polymers including thermoplastic and thermosetting types. Moreover, since the emulsions of the present invention do not contain water, adverse effects on the corrosion resistance of substrates are avoided.

SUMMARY OF THE INVENTION

It is an object of the present invention to provide microporous, opaque, non-pigmented films. It is a further and more specific object of the invention to produce such films from an emulsion of the oil-in-oil type.

These objects are in general achieved by applying to a substrate a coating composition of the oil-in-oil type comprising: (A) a continuous phase comprising a film-forming gelable polymer dissolved in an organic solvent and (B) a dispersed phase comprising minute droplets of an emulsified high-boiling organic non-solvent. The film-forming emulsion is prepared by dissolving a film-forming gelable polymer in a volatile organic solvent to produce a continuous phase of polymer solution and then adding to the continuous phase a high boiling organic liquid which is a non-solvent for the film-forming polymer and which is immiscible with the organic solvent to form a dispersed phase comprising minute droplets of emulsified high boiling organic non-solvent. Upon application of the emulsion to the substrate, the polymer solvent evaporates causing the film-forming polymer to gel, entrapping therein the high-boiling organic non-solvent and upon further evaporation the non-solvent is removed, leaving behind small voids which render the film opaque.

Films produced by the process and compositions of the present invention may be utilized as coatings in a variety of applications such as, for example, in automotive finishes appliance finishes, wood finishes, and the like.

DESCRIPTION OF THE PREFERRED EMBODIMENTS

Various film-forming gelable polymers may be used in the practice of this invention with the only limitation that they must be soluble in (i.e., miscible with) the particular solvent used and they must be capable of gelling (i.e., being transformed from the liquid phase to the solid phase) upon evaporation of a portion of the solvent.

The film-forming, gelable polymers which may be used in the practice of this invention are well-known in the art. These include various types of polymers such as thermoplastic and thermosetting synthetic and natural polymers. Thermoplastic synthetic and natural polymers may be used, although thermosetting polymers are the preferred resins since they are resistant to heat and are extremely durable and abrasion resistant.

The thermosetting resins which may be used in the practice of this invention are well known in the art. Such resins are curable to a crosslinked thermoset condition by the use of either heat and/or a curing agent as well as by other methods, such as radiation.

One preferred group of thermosetting resins which may be used in the practice of this invention are admixtures of interpolymers of hydroxyl esters of ethylenically unsaturated acids with at least one other polymerizable ethylenically unsaturated monomer. Interpolymers of hydroxyl esters of unsaturated acids with at least one other polymerizable ethylenically unsaturated monomer are prepared by interpolymerizing a mixture of monomers comprising from about 2 to about 50 percent by weight of a hydroxyalkyl ester of an ethylenically unsaturated monomer copolymerizable therewith. In many cases, more than one hydroxyalkyl ester in included in the interpolymer, and generally several monomers in addition to the hydroxyalkyl ester or esters are employed. These interpolymers are produced in a manner well known in the art, using conventional procedures utilizing catalysts well known in the art.

Free radical producing catalysts are commonly used but catalyst systems which function through other mechanism can also be employed. The conditions of time, temperature and the like at which these interpolymerizations are carried out are also conventional and depend in large part upon the particular catalyst employed.

Preferred monomer systems used to produce these interpolymers are those containing hydroxyalkyl esters in which the alkyl group has up to about 12 carbon atoms. Especially preferred esters are acrylic acid and methacrylic acid esters of glycol and 1,2-propylene glycol, i.e., hydroxyethyl acrylate and methacrylate. Combinations of these esters are also widely used. However, there may also be employed similar esters of other unsaturated acids, for example, ethacrylic acid, crotonic acid, and similar acids having up to about 6 carbon atoms, as well as esters containing other hydroxyalkyl radicals, such as hydroxybutyl esters and hydroxylauryl esters.

In addition to esters of unsaturated monocarboxylic acids, there may be employed the mono- or diesters of unsaturated dicarboxylic acids, such as maleic acid, fumaric acid, and itaconic acid, in which at least one of the esterifying groups is hydroxyalkyl. Such esters include bis(hydroxyethyl)maleate, bis(hydroxypropyl)fumarate, and similar bis(hydroxyalkyl) esters, such as butyl hydroxyethyl maleate and benzyl hydroxypropyl maleate. Monoesters such as mono(hydroxyethyl) and mono(hydroxypropyl) esters of maleic acid and similar acids can also be used.

The monomer or monomers with which the hydroxyalkyl esters is interpolymerized can be any ehtylenic compound copolymerizable with the ester, the polymerization taking place through the ethylenically unsaturated linkages. These include monoolefinic and diolefinic hydrocarbons, halogenated monoolefinic and diolefinic hydrocarbons, unsaturated esters of organic and inorganic acids, esters of unsaturated acids, nitriles, unsaturated acids, and the like. Examples of such monomers include styrene, 1,3-butadiene, 2-chlorobutene, alpha-methyl styrene, alpha-chlorostyrene, 2-chloro-1,3-butadiene, 1,1-dichloroethylene, binyl butyrate, vinyl acetate, allyl chloride, dimethyl maleate, divinyl benzene, diallyl itaconate, triallyl cyanurate, and the like.

The most useful interpolymers of this type are produced from the interpolymerization of one or more hydroxyalkyl esters with one or more alkyl esters of ethylenically-unsaturated carboxylic acids or a vinyl aromatic hydrocarbon, or both. Among these preferred comonomers are the ethyl, methyl, propyl, butyl, hexyl, ethyl hexyl, and lauryl acrylates and methacrylates. as awell as similar esters having up to about 20 carbon atoms in the alkyl group. Among the vinyl aromatic hydrocarbons generally utilized are styrene and alpha-alkylstyrene or vinyltoluene. The preferred monomer systems may include an ethylenically unsaturated nitrile, such as acrylonitrile or methacrylonitrile, and in many instances an ethylenically unsaturated carboxylic acid is present, of which the preferred are acrylic acid and methacrylic acid. The specific comonomers most often employed are methyl methacrylate, ethyl acrylate, styrene, vinyl toluene, acrylonitrile, methacrylonitrile, methacrylic acid, acrylic acid, 2-ethylhexyl acrylate, butyl acrylate, butyl methacrylate, and lauryl methacrylate.

Examples of catalysts ordinarily used in the interpolymerization include peroxygen compounds such as benzoyl peroxide, cumeme hydroperoxide, hydrogen peroxide, and t-butylperoxy isopropyl carbonate, and azo compounds such as alpha, alpha-azobis(isobutyronitrile) and p-methoxyphenyl diazothio(2-naphthyl)ether.

Crosslinking agents for interpolymers of hydroxyalkyl esters are materials which contain functional groups reactive with the hydroxyl groups of the interpolymer. Examples of such coreactive materials include polyisocyanates, such as toluene diisocyanate and isocyanato-containing polymeric products; aminoplast resins, such as hexa(methoxymethyl)melamine and others described hereinafter; epoxy resins, such as polyglycidyl ethers of 2,2-bis(4-hydroxyphenyl)propane, commonly known as bisphenol A; and others, e.g., silicone resins.

Another group of thermosetting resins which may be used are carboxylic acid amide interpolymers of the type disclosed in U.S. Pat. Nos. 3,037,963 and 3,118,853. These interpolymers are prepared by forming an interpolymer of from about 2 to about 50 percent based upon the total weight of the interpolymer of an unsaturated carboxylic acid amide, such as acrylamide or methacrylamide, with at least one other polymerizable ethylenically unsaturated monomer, and then reacting the interpolymer with an alcohol, such as butanol. The aldehyde reacts with the amido groups to form alkylol groups and further reaction with alcohol results in etherification of the alkylol groups to alkoxyalkyl groups.

It is desirable that at least about 50 percent of the alkylol groups be etherified since compositions having less than about 50 percent of the alkylol groups etherified tend to be unstable and subject to gelation. Butanol is the preferred alcohol for use in the etherification process, although any alcohol such as methanol, ethanol, propanol, pentanol, octanol, decanol, and other alkanols containing up to about 20 carbon atoms may also be employed as may aromatic alcohols such as benzyl alcohol or cyclic alcohols.

While either acrylamide or methacrylamide is preferred for use in forming the interpolymer component, any unsaturated carboxylic acid amide can be employed. Such other amides include itaconic acid diamide, alphaethyl acrylamide, crotonamide, fumaric acid diamide, maleic acid diamide, and other amides of alpha, beta-ethylenically unsaturated carboxylic acids containing up to about 10 carbon atoms. Maleuric acid, and esters thereof, and amide derivatives such as N-carbamyl-maleimide may also be utilized.

Any polymerizable monomeric compound containing at least one

group may be polymerized with the unsaturated carboxylic acid amide. These include monoolefinic and diolefinic hydrocarbons, unsaturated esters of organic and inorganic acids, esters of unsaturated acids, nitriles, unsaturated acids, and the like. Examples of such monomers include styrene, isobutylene, 1,3-butadiene, 2-chlorobutene, vinyl chloride, vinylidene chloride, alpha-methylstyrene, alpha-chlorostyrene, 2-chlorostyrene, 2-chloro-1,3-butadiene, 1,1-dichloroethylene, vinyl butyrate, vinyl acetate, allyl chloride, methyl methacrylate, methyl actylate, ethyl methacrylate, ethyl acrylate, butyl methacrylate, butyl acrylate, lauryl methacrylate, acrylonitrile, methacrylonitrile, acrylic acid, methacrylic acid and vinyl silicone containing compounds.

The preparation of such amide interpolymers is described in detail in U.S. Pat. Nos. 2,870,116 and 2,870,117.

Aldehyde-modified and etherified amide in interpolymers can also be produced by first reacting the unsaturated amide with an aldehyde and, if desired, an alcohol, to form an N-alkylol or an N-alkoxyalkyl-substituted amide. The N-substituted amide than is interpolymerized with the other monomer or monomers as described above, thereby producing interpolymers having the aforesaid recurrent groups without the need for further reaction. Such a method utilizing N-alkoxyalkyl-substituted amides is described in U.S. Pat. No. 3,079,434.

Another group of thermosetting resins which may be used in the practice of this invention are the epoxy resins. Epoxy resins include those generally prepared by the combination of a polyhydric compound with epichlorohydrin in combination with a nucleophilic curing agent to form polymers having terminal epoxy groups as shown in the formula below:

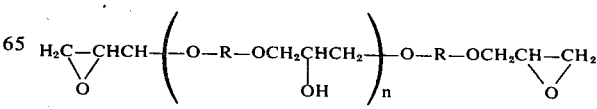

The proportion of excess epichlorohydrin can be chosen to regulate the polymer molecular weight. Resins which may be employed in the practice of this invention typically have from 0 to about 20 recurring units designated above as n.

Suitable polyhydric compounds which may be used as reactants to prepare the epoxy resins are ethylene glycol, diethylene glycol, glycerol, 1,3,5-trihydroxybenzene, resorcinol, 1,5-dihydroxynaphthalene, 2,2,5,5-tetra-kis(4-hydroxyphenyl)hexane, 2,2-bis(4-hydroxyphenyl)propane, commonly known as bisphenol A, and polyethers of polyalkylene oxide polyols with functionality substituted phenols (e.g., the epoxides disclosed in U.S. Pat. Nos. 3,145,191 and 3,393,229. Bisphenol A is the preferred polyol employed in the practice of this invention due to its availability and highly desirable properties.

Another group of useful epoxy-containing polymers which may be employed in the practice of this invention are copolymers of acrylates, such as 2-ethylhexyl acrylate and/or methacrylates such as methyl methacrylate, with up to 50 percent of a comonomer such as dibutyl maleate or fumarate, butyl glycidyl maleate or fumarate and glycidyl methacrylate.

Still another group of useful epoxy-containing polymers are the cycloaliphatic epoxides disclosed in U.S. Pat. No. 3,315,011, incorporated herein by reference.

Crosslinking agents for the epoxy resins include active hydrogencontaining materials such as acids, amines, and the like. These nucleophilic curing agents are generally known in the art and can be organic acids or anhydrides, mono- or polyamines, or resinous substances such as the phenolic, urea, melamine, and sulfonamide resins, as well as polysulfide polymers, polyamides, etc. The relative proportion of curing agent to epoxy resin is not critical, but there is generally from about 5 to about 50 percent of curing agent employed for this purpose.

The preferred crosslinking agents are the amine-containing compounds such as ethylene diamine, diethylene triamine, triethylene tetramine, tetraethylene pentamine, dimethyl aminomethylphenol and benzyl dimethylamine.

Other useful curing agents are the amine salts of fatty acids and the aminoplasts described above.

The thermosetting resins described above may be used as the sole film-forming polymer in the present emulsions or mixtures of two or more of these thermosetting resins may also be employed.

The thermoplastic resins which may be employed in the practice of this invention are well-known in the art.

Examples of thermoplastic resins which may be used include cellulose derivatives (e.g., ethyl cellulose, nitrocellulose, cellulose acetate, cellulose propionate and cellulose acetate butyrate); acrylic resins (e.g., homopolymers and copolymers with each other or with other monomers of monomers containing an acrylyl or methacrylyl group, such as methyl methacrylate, ethyl acrylate, ethyl methacrylate, butyl acrylate, butyl methacrylate, acrylic acid and methacrylic acid); polyolefins (e.g., polyethylene and polypropylene); nylon; polycarbonates; polystyrene; copolymers of styrene and other vinyl monomers such as acrylonitrile; vinyl polymers such as homopolymers and copolymers of vinyl acetate, vinyl alcohol, vinyl chloride and vinyl butyral; homopolymers and copolymers of dienes such as polybutadiene, butadiene-styrene copolymers and butadiene-acrylonitrile copolymers.

Graft copolymers or block copolymers may also be used as the thermoplastic resin. Such copolymers possess segmental periodicity, i.e., they contain continuous sequences of one monomer that are not governed by statistical distribution. They may be formed by methods known in the art such as by polymerizing a vinylidene monomer in the presence of an appropriate preformed polymer and catalyst. Specific details for the preparation of graft copolymers are described, for example, in U.S. Pat. No. 3,232,903. The preformed polymer may be, for example, a polymeric ester of acrylic acid or methacrylic acid, such as a copolymer of an ester of methacrylic acid or acrylic acid formed formed with an alcohol having 4 to 18 carbon atoms or of a mixture of such esters with esters of methacrylic acid or acrylic acid formed with alcohols having 1 to 5 carbon atoms. Mixtures of methacrylate and acrylate esters with from 1 one percent to 50 percent by weight of monoethylenically unsaturated monomers such as maleic anhydride, acrylic acid, methacrylic acid, vinyl pyrrolidone, N-dimethylaminoethyl acrylate or methacrylate, N,N-dimethylaminoethylacrylamide or methacrylamide, dimethylaminoethyl vinyl ether, dimethylaminoethyl vinyl fulfide, vinyl acetate, vinyl propionate, vinyl laurate, vinyl stearate, vinyl oleate, ethylene, isobutylene, acrylamide, methacrylamide, acrylonitrile, methacrylonitrile, vinyl ethyl ether and vinyl isobutyl ether may also be used in the preparation of the preformed polymer.

Vinylidene monomers which may be polymerized in the presence of the preformed polymer include vinyl esters of fatty acids having from 1 to 18 carbon atoms such as vinyl acetate, vinyl propionate, binyl butyrate, vinyl laurate, vinyl oleate and vinyl stearate; esters of acrylic acid or methacrylic acid with alcohols having from 1 to 18 carbon atoms such as methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, cyclohexyl acrylate, cyclohexyl methacrylate, etc.; acrylonitrile, methacrylonitrile, acrylamide, methacrylamide, styrene, alpha-methyl styrene, vinyl toluene, acrylic acid, acrylic acid anhydride, methacrylic acid, methacrylic acid anhydride, fumaric acid, crotonic acid, allyl acetate, glycidyl methacrylate, t-butylaminoethyl methacrylate; hydroxyalkyl acrylates or methacrylates, such as beta-hydroxyethyl methacrylate, beta-hydroxyethyl vinyl ether, beta-hydroxyethyl vinyl sulfide, vinyl pyrrolidone, N,N-dimethylaminoethyl methacrylate, ethylene, propylene, vinyl chloride, vinyl fluoride, vinylidene fluoride, hexafluoropropylene, chlorotricluoroethylene, and tetrafluoroethylene.

To form the continuous phase of the emulsions of the present invention, the film-forming gelable polymer may be dissolved in the organic solvent as such. Alternatively, the corresponding monomer or monomers may be added to the organic solvent and the film-forming polymeric material then formed in situ by polymerizing the monomers in the solvent. Polymerization-catalysts, such as organic peroxides, and polymerization modifiers such as tertiary dodecyl mercaptan and carbon tetrachloride may be employed in accordance with well-known techniques.

The disperse or discontinuous phase of the emulsion is produced by adding a high boiling organic liquid non-solvent to the polymer solution making up the continuous phase.

As used herein, the term "high boiling" denotes a liquid having a lower volatility than the polymer solvent. The term "non-solvent" denotes a liquid in which the polymer does not dissolve to any appreciable extent.

The basic requirements for the non-solvent are that it be immiscible with the solvent, less volatile than the solvent, and that it be a non-solvent for the polymer. Thus, it will be understood that each polymer or copolymer will have its own combination of usable solvents and non-solvents. Accordingly, in preparing the present emulsions, attention must not only be given to selecting an organic liquid which is a non-solvent for the particular polymer involved, but the non-solvent selected must also be immiscible with the polymer solvent. Non-solvents which are suitable for a particular system may be readily selected by the skilled artisan on the basis of the known physical properties of liquids and polymers. One method which may be employed in selecting an optimum nonsolvent for a particular system is the method described by Hansen in an article entitled "The Three Dimensional Solubility Parameter and Solvent Diffusion Coefficient and Their Importance in Surface Coating Formation" published in the Danish Technical Press, Copenhagen (1967). The method described by Hansen can be employed to determine liquids which will not solubilize the particular polymers selected. Once these liquids are ascertained, the solubility parameters found in the work of Hoy (Tables of Solubility Parameters, Union Carbide Corporation, South Charleston, W.Va., May 31, 1967) may be utilized. The work of Hoy tabulates the relative evaporation rates of liquids wherein a non-solvent can be selected which has a low enough volatility to remain in the coating long enough to form voids before evaporating. In this manner, useful non-solvents may be determined for the particular polymer selected. These non-solvents may then be checked for miscibility with known organic solvents for the polymer, thereby permitting the selection of an organic liquid which is a non-solvent for the polymer and is immiscible with the polymer solvent. Alternatively, organic liquids which are immiscible with known polymer solvents may first be determined by well-known techniques and then evaluated by the methods of Hansen and Hoy to determine their polymer solubility and volatility characteristics.

Some examples of solvent and immiscible non-solvent combinations which may be suitably employed with particular polymers are nitromethane (a solvent for cellulose acetate butyrate) and aliphatic hydrocarbons such as hexane, cyclohexane, decane, undecane, dodecane, and the like as immiscible non-solvents. Where the polymer solvents are glycols, immiscible non-solvents such as the aliphatic hydrocarbons referred to above may be employed. Other suitable solvent-immiscible non-solvent combinations which may advantageously be employed are: mineral spirits with aliphatic alcohols such as methanol, ethanol, and the like; mineral spirits with glycols such as ethylene glycol, propylene glycol, diethylene glycol, and the like; propylene carbonate with aliphatic hydrocarbons; and gamma butyrol lactone with aliphatic hydrocarbons.

The amount of low volatility non-solvent liquid present in the emulsion is preferably just enough to produce, upon the removal of the solvent and non-solvent from a film formed from the composition having in the absence of materials such as pigments, optical brighteners and fluorescent materials, a Kubelka-Munk scattering coefficient greater than 0.5 reciprocal mil at 4400 angstroms and greater than 0.1 reciprocal mil at 5,600 angstroms. However, the amount of the low volatility non-solvent present in the solvent system must be less than that which, upon the removal of the solvent and non-solvent from a film formed from the composition, would produce a discontinuous film, i.e., a film containing interconnected open cells.

When these requirements are met and a film is formed from the composition, the more volatile liquid evaporates at a greater rate than the low volatility non-solvent. After a portion of the solvent has evaporated, the film-forming polymer gels entrapping droplets of the low volatility non-solvent liquid in the polymer which forms a rigid structure. Subsequently, the low volatility non-solvent evaporates, leaving microscopic voids in the rigid structure. These microscopic voids cause light scattering and opacity and results in the film being microporous and having in the absence of an opacifying agent a Kubelka-Munk scattering coefficient as previously defined.

If not enough of the lower volatility non-solvent is present in the system prior to establishing a rigid structure as defined hereinabove, a film formed from the composition may appear upon drying or curing as a clear or a blushed film having in the absence of an opacifying agent a Kubelka-Munk scattering coefficient less than 0.5 reciprocal mil at 4400 angstroms and less than 0.1 reciprocal mil at 5,600 angstroms and will not contain sufficient micropores to cause opacity.

The organic high boiling immiscible non-solvent liquids employed herein are added to the continuous polymer solution phase to form the emulsions of the present invention. Depending on the intended use for the film produced from the emulsion, various additives may be added to the composition along with the liquid non-solvent. One such additive which is ordinarily required to assure emulsion stability is an emulsifying agent.

The emulsifying agents which may be employed include many conventional and well-known materials. An especially preferred emulsifying agent is the surfactant known commercially as "Span 20," which is sorbitan monolaurate.

As mentioned above, various other materials known in the coatings industry may also be added to the composition of this invention to achieve particular desired results. Among some of the materials which may be added to the compositions of this invention are fungicides, mildewcides, flow modifiers, thickeners, free flow stabilizers, antiflocculants, and various other additives known to those skilled in the art.

Films produced from the emulsion compositions of the present invention are opaque and white due solely to the presence of the microscopic voids contained therein. However, in applications where colored films or films having an enhanced whiteness are desired, color forming materials such as pigments may be included in the composition. The amount of pigment employed for this purpose is less than the amount of pigment normally required to opacify the film-forming material used, i.e., less than the amount of pigment required to provide an equivalent degree of opacification of such a film in the absence of the microscopic voids. Moreover, when a white pigment (e.g., $TiO_2$) is employed in combination with the voids, a film of enhanced whiteness may be attained.

When pigments are employed in the emulsion compositions of this invention, the resultant film may contain the pigment either in the polymer portion of the film or within the microscopic voids formed by the removal of the non-solvent from the film. This depends upon the method used to incorporate the pigment into the emulsion composition.

One method of incorporating pigment into films formed from the emulsion compositions of the present invention comprises dispersing finely ground pigment particles in the organic liquid non-solvent. The liquid non-solvent pigment dispersion is then added to the continuous phase polymer solution and an intermediate film having dispersed therein minute droplets of liquid non-solvent pigment is formed. Upon removal of the non-solvent from the intermediate product, as by evaporation, the pigment is deposited upon the interval surface of the voids found when the non-solvent is removed.

Pigments may also be incorporated directly into the polymer component of films formed from the present emulsions rather than specifically within the voids as described above. This may be done by dispersing pigment in the continuous polymer solution phase rather than in the liquid non-solvent. When the solvent is removed, the pigment particles are entrapped in the gelled polymer in the same manner as the minute droplets of liquid non-solvent are entrapped. Upon evaporation of the non-solvent, a film is formed wherein the polymer contains both pigment particles and minute discrete voids.

Pigments which may advantageously be employed for this purpose are well-known in the art. Thus, conventional pigments such as titanium dioxide, carbon black, talc, barytes, and the like as well as conventional color pigments such as cadmium yellow, cadmium red, phthalocyanine blue, chromic yellow, toluidene red and the like may be used.

The emulsion compositions of this invention are formed into films and dried by conventional techniques. By drying is meant producing a relatively hard, dry film. Depending on the film-forming material utilized, this may require only evaporation of solvents, or the application of heat or a curing agent may be required. Any such film-forming mechanism can be employed to produce films in accordance with the invention herein. When utilized as coating compositions, the emulsion compositions herein can be applied to numerous substrates, including, e.g., steel, aluminum, and other metals as well as wood, plastic, paper, and the like. These compositions may be coated onto such substrates by brushing, spraying, dipping, roller coating, knife coating and the like, and air-dried, air-cured, vacuum-dried, or baked at elevated temperatures.

The example which follows is submitted for the purpose of further illustrating the present invention and should not be regarded as a limitation on the scope thereof.

EXAMPLE I

Ten grams of cellulose acetate butyrate were dissolved in 100 milliliters of nitromethane using a 250 milliliter flask equipped with an air stirrer. To this solution was added 2 milliliters of sorbitan monolaurate, an emulsion stabilizer. Then 5 milliliter increments of an aliphatic hydrocarbon non-solvent ("Isopar M", boiling point range 405°F. to 495°F.) immiscible with nitromethane was added to the solution using thorough agitation to disperse the non-solvent. A total of 50 milliliters of the non-solvent was added in this manner. After the addition of each 5 milliliter increment of non-solvent, a sample of the emulsion was spread on a piece of draw down paper with a wooden applicator and permitted to dry in air. The hardened films obtained from these samples contained microscopic voids from the evaporation of the non-solvent and were opaque and white.

According to the provisions of the Patent Statutes, there are described above the invention and what are now considered to be its best embodiments. However, within the scope of the appended claims, it is to be understood that the invention can be practiced otherwise than as described.

We claim:
1. A coating composition consisting essentially of an oil-in-oil emulsion having:
   a. a continuous phase consisting of a film-forming gelable organic polymer dissolved in an organic solvent; and
   b. a dispersed phase consisting of minute droplets of an organic liquid which is immiscible with the organic solvent and which is a non-solvent for the film-forming gelable organic polymer;
   wherein the amount of said organic liquid non-solvent of low volatility present in the composition is sufficient to produce a continuous opaque film containing minute, discrete and closed voids upon removal of said organic solvent and said non-solvent from said composition; and
   wherein said film has a Kubelka-Munk scattering coefficient greater than 0.5 reciprocal mil at 4400 angstroms and greater than 0.1 reciprocal mil at 5600 angstroms; and
   wherein the amount of said organic liquid non-solvent present in the composition is less than that which upon removal of said organic solvent and said non-solvent from said composition produces a discontinuous film.
2. The coating composition of claim 1 wherein the film-forming gelable polymer is a thermosetting polymer.
3. The coating composition of claim 2 wherein the thermosetting polymer is an admixture of an interpolymer of a hydroxyl ester of an ethylenically unsaturated acid with at least one other polymerizable ethylenically unsaturated monomer.
4. The coating composition of claim 1 wherein the film-forming gelable polymer is a thermoplastic polymer.
5. The coating composition of claim 4 wherein the thermoplastic polymer is a cellulose derivative selected from the group consisting of ethyl cellulose, nitrocellulose, cellulose acetate, cellulose propionate and cellulose acetate butyrate.
6. The coating composition of claim 5 wherein the thermoplastic polymer is cellulose acetate butyrate.
7. The coating composition of claim 1 wherein an emulsion stabilizer is added to the composition.

8. The coating composition of claim 7 wherein the emulsion stabilizer is sorbitan monolaurate.

9. A method of producing a continuous opaque film containing minute, discrete closed void which comprises the steps of:
  a. applying to a substrate a coating composition consisting essentially of an oil-in-oil emulsion having:
    1. a continuous phase consisting of a filmforming gelable organic polymer dissolved in an organic solvent; and
    2. a dispersed phase consisting of minute droplets of an organic liquid which is a non-solvent for said polymer and is immiscible with said organic solvent and has a lower volatility than said organic solvent, wherein the amount of said lower volatility non-solvent liquid which is present in the composition is sufficient to produce upon removal of said organic solvent and said non-solvent a continuous opaque film containing minute, discrete closed voids, said film having a Kubelka-Munk scattering coefficient greater than 0.5 reciprocal mil at 4,400 angstroms and greater than 0.1 reciprocal mil at 5,600 angstroms, and less than that which upon removal of said solvent and said non-solvent from said composition produces a discontinuous film;
  b. evaporating the organic solvent from the applied composition to cause the film-forming polymer to gel, thereby forming a film having entrapped therein the minute droplets of said non-solvent; and
  c. thereafter evaporating the non-solvent to produce a continuous opaque film having minute, discrete and closed voids therein.

10. The method of claim 9 wherein the gelable polymer is a thermosetting polymer comprising an admixture of an interpolymer of a hydroxyl ester of an ethylenically unsaturated acid with at least one other polymerizable ethylenically unsaturated monomer.

11. The method of claim 9 wherein the gelable polymer is a thermoplastic polymer.

12. The method of claim 9 wherein the thermoplastic polymer is a cellulose derivative selected from the group consisting of ethyl cellulose, nitrocellulose, cellulose acetate, cellulose propionate, and cellulose acetate butyrate.

13. The method of claim 12 wherein the thermoplastic polymer is cellulose acetate butyrate.

14. The method of claim 9 wherein an emulsion stabilizer is added to the emulsion prioer to applying said emulsion to said substrate.

15. The method of claim 14 wherein the emulsion stabilizer is sorbitan monolaurate.

* * * * *